UNITED STATES PATENT OFFICE.

BERTHOLD TAUSK, OF BERLIN, GERMANY.

PROCESS OF TREATING FEATHER FUR.

SPECIFICATION forming part of Letters Patent No. 505,141, dated September 19, 1893.

Application filed August 10, 1892. Serial No. 442,724. (No specimens.)

*To all whom it may concern:*

Be it known that I, BERTHOLD TAUSK, a subject of the German Emperor, residing at Berlin, in the Province of Brandenburg and Kingdom of Prussia, Germany, have invented certain new and useful Improvements in Processes of Treating Feather Fur; and I do hereby declare the following to be a full, clear, and exact description of the invention, such as will enable others skilled in the art to which it appertains to make and use the same.

The present invention consists in a process of manufacturing a fur of feathers or to give to the feathers used for such manufacture an appearance similar to that of animal fur. The feather fur made of the feathers of the turkey has been for a long time a desirable decoration for lining garments and has been made and used in great quantities. However the appearance of this feather fur is a dull and woolly one resembling therefore very little the genuine animal fur and so the fashion of this imitation has gradually diminished so that the demand for the same is quite insignificant.

The object of the present invention is to make this feather fur indistinguishable from animal fur and equally available for use.

The process is not only appropriate for the above mentioned turkey feathers but can be used just as well for all other feathers. The process is carried out in the following manner: The feather fur obtained in the ordinary way or the single feathers, are moistened with dilute sulphuric acid which makes the feathers suitable for further treatment; then they are partly dried. The feather fur or the feathers then in the state of being half dry are dipped into a liquid or moistened with the same, which liquid is composed of a mixture of soap or solution of soda or any other equivalent alkaline substance oil, resin, and spermaceti. When the goods are sufficiently moistened with this solution they are exposed to a dry heat of 40° to 45° centigrade till they are perfectly dry which is effected in about twenty four hours. By this drying process the stems of the feathers bake together, the said mixture having a pasting action and in order to separate them again they must be treated with hard brushes. Thereafter the goods are exposed for a short time to moist vapors whereby the stems are restored completely to their original condition. Then the material is dried again and finally moistened with alcohol or wood spirit in order to take off the fatty shine which the goods still show.

In order to harden the fibers they are treated with a solution of alum (one part of alum to twenty parts of water), so that they obtain the same rigidity as the natural hair. The goods so treated cannot be distinguished in the outer appearance from genuine animal fur.

The main point of the invention consists in the treatment of the feathers with the above mentioned solution. Many trials have shown that the following mixture is of special advantage: To one liter of water are taken two hundred grams soap of potassium or potash-soap, or solution of soda, thirty-two grams olive oil, sixteen grams colophony, sixteen grams spermaceti.

The soap or its equivalent is used as a means of solution for the mixture of oil, colophony and spermaceti which acts as a pasty matter.

The operator can modify these proportions without departing from the spirit of my invention, also the indicated substances may be substituted by others of similar nature having a similar effect; for instance in place of spermaceti another fat may be used.

Having thus described my invention, what I desire to secure by Letters Patent is—

The process of treating feather fur which consists in the following steps: first moistening it with a dilute solution of acid, then applying to it a mixture composed of soap, or an equivalent alkaline solution, and oily or fatty substances; then in drying, brushing, and steaming it, and finally in hardening it by the application of a solution of alum, substantially as set forth.

In testimony whereof I affix my signature in presence of two witnesses.

BERTHOLD TAUSK.

Witnesses:
L. A. EDWARDS,
W. HAUPT.